(No Model.)  3 Sheets—Sheet 1.
J. B. EDSON.
COMBINED RULING, PRINTING, AND NUMBERING MACHINE.
No. 593,961. Patented Nov. 16, 1897.
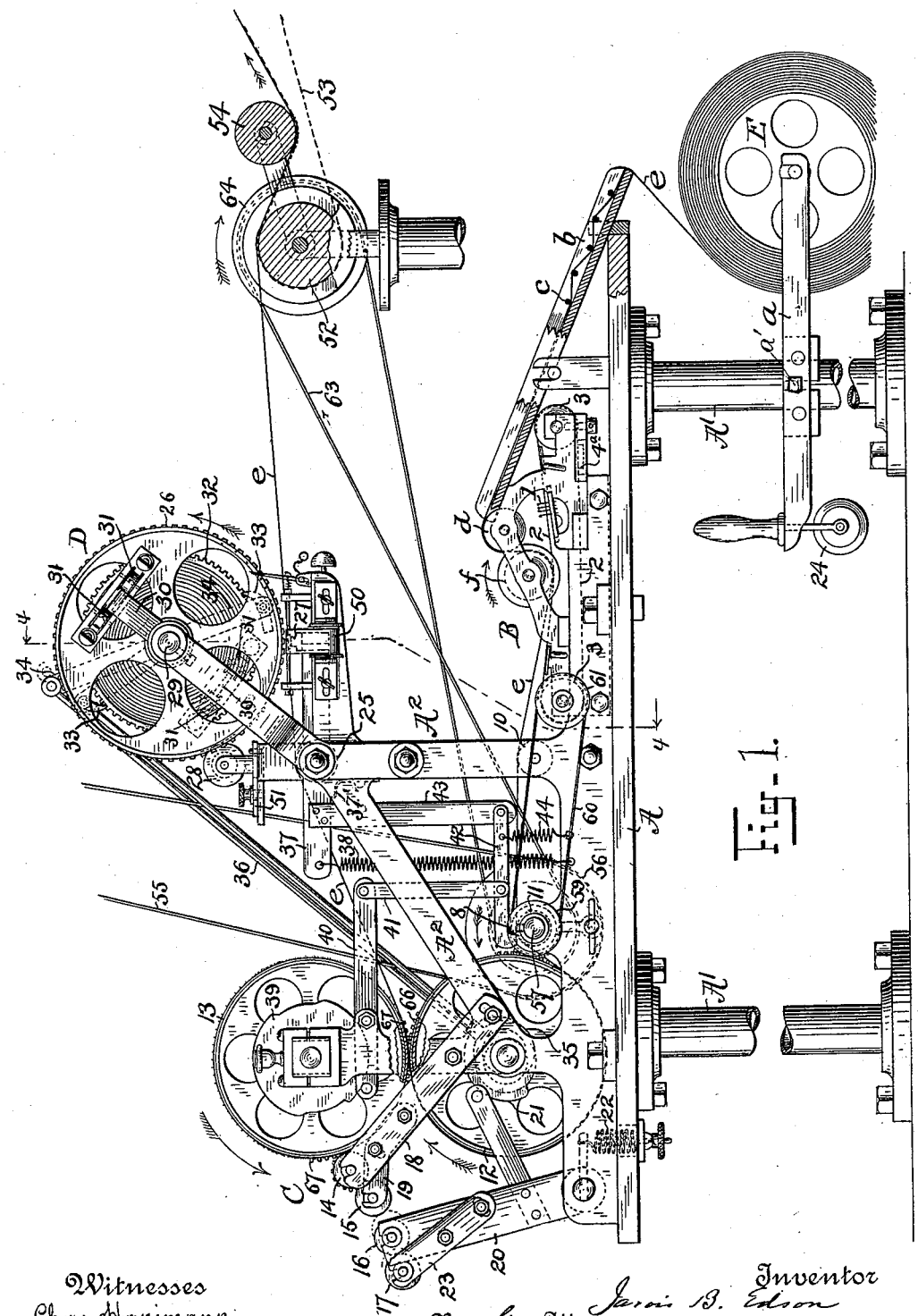
Witnesses
Chas. Hanimann
Ted C Graham
Inventor
Jarvis B. Edson
By his Attorney
Chas. W. Yorke (No Model.) 3 Sheets—Sheet 2.
J. B. EDSON.
COMBINED RULING, PRINTING, AND NUMBERING MACHINE.
No. 593,961. Patented Nov. 16, 1897.
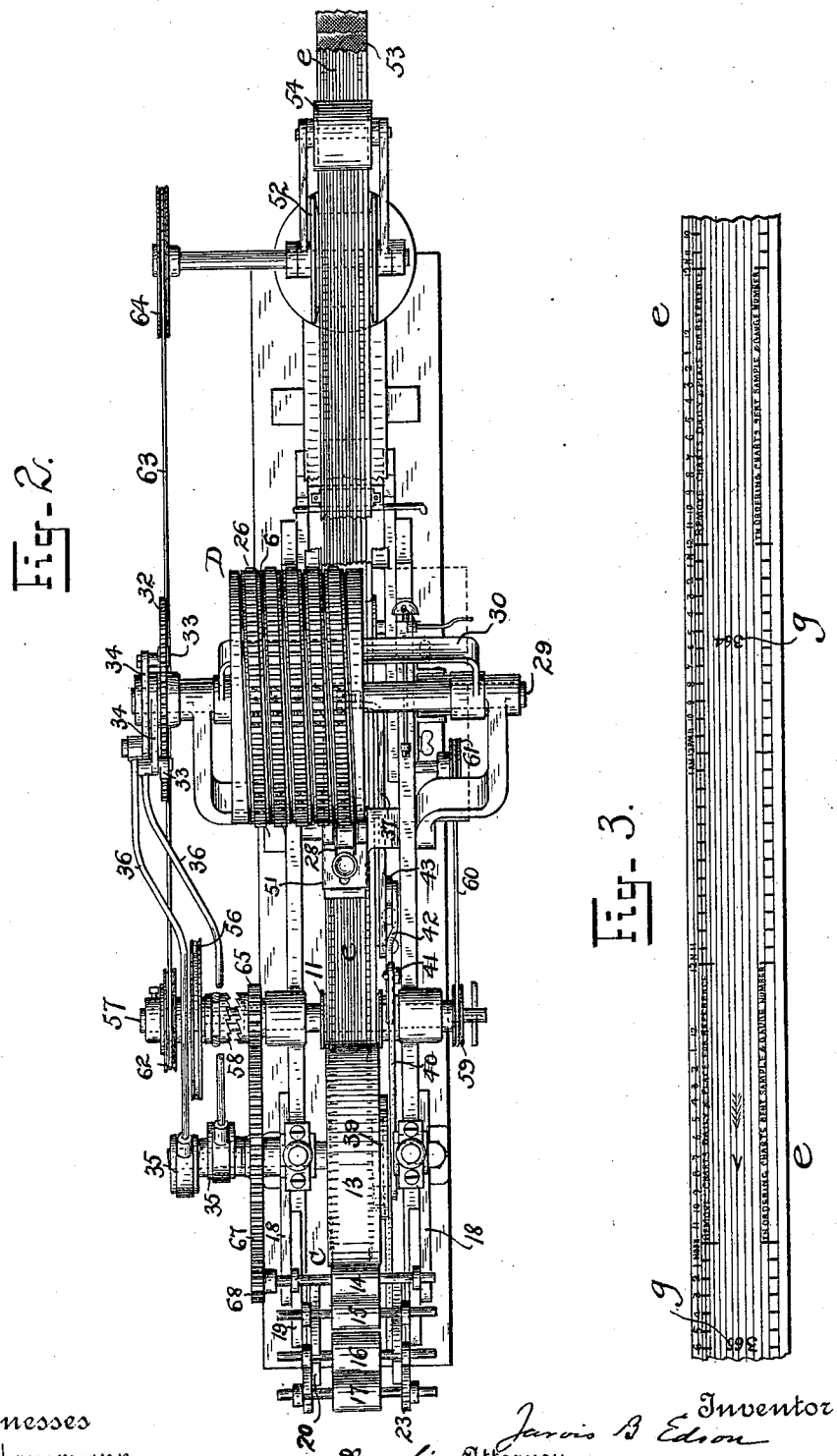
Witnesses
Chas. Hanmann.
Geo. H. Graham.
Inventor
Jarvis B. Edson
By his Attorney
Chas. W. Forbes

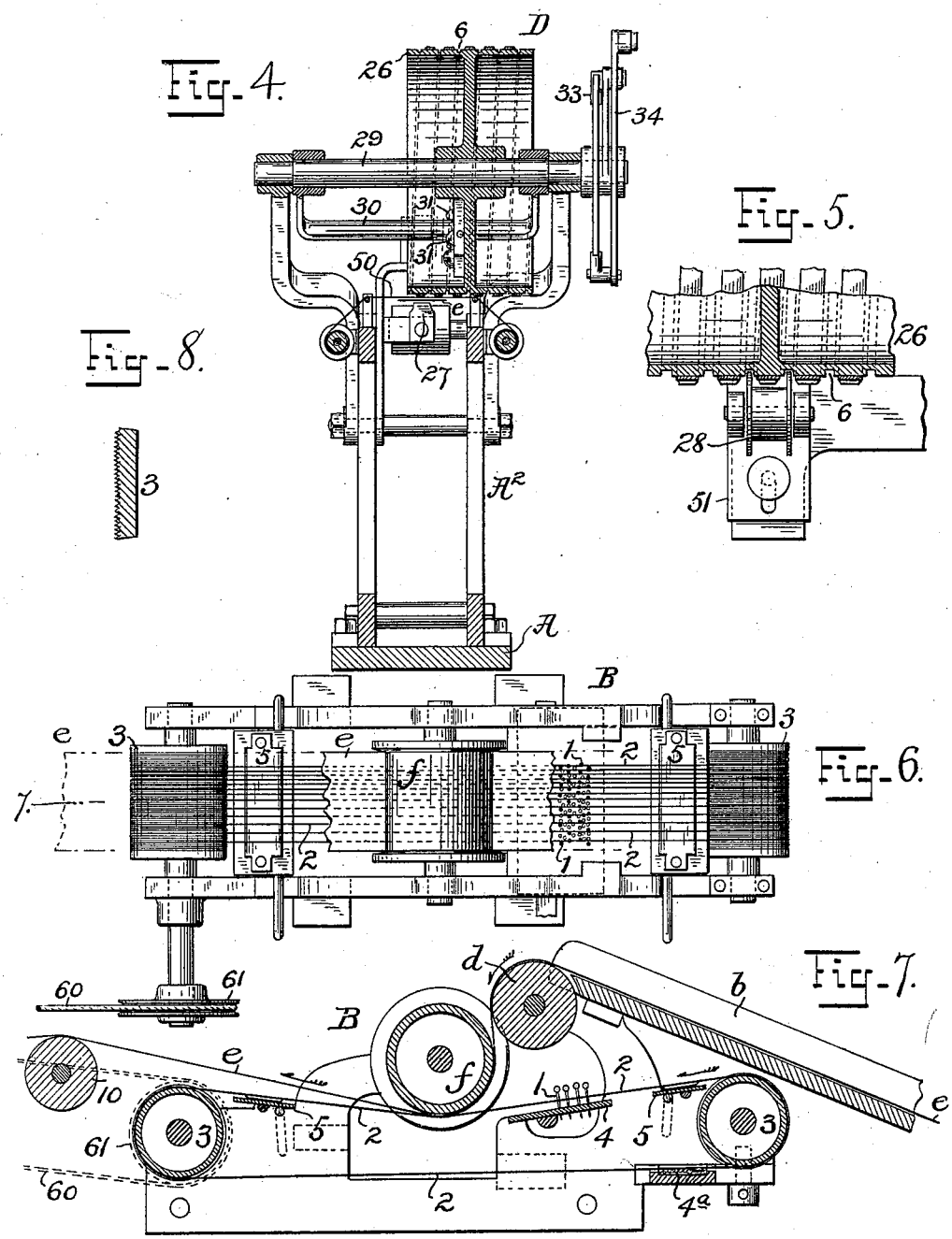

UNITED STATES PATENT OFFICE.

JARVIS B. EDSON, OF SHELTER ISLAND, NEW YORK.

COMBINED RULING, PRINTING, AND NUMBERING MACHINE.

SPECIFICATION forming part of Letters Patent No. 593,961, dated November 16, 1897.

Application filed July 29, 1896. Serial No. 600,993. (No model.)

*To all whom it may concern:*

Be it known that I, JARVIS B. EDSON, a citizen of the United States of America, residing at Shelter Island, Suffolk county, State of New York, have invented certain new and useful Improvements in Means for Preparing the Recording-Ribbons of Pressure-Gages, of which the following is a specification.

The present invention relates generally to means for preparing the recording ribbon or sheet for use with recording instruments of pressure-gages to the end that the accurate reading of the record may be facilitated. The recording-ribbon is provided with a plurality of longitudinal lines disposed at different distances apart, the distance between the lines representing changes in pressures to be recorded by the movement thereover of the recording-stylus, the distances between the several lines being necessarily suited to the action of the particular pressure-gage with which the recording-ribbon is used. As no two gages act precisely alike it has long been a desideratum to provide means by which the record-bearing ribbons for any number of given gages may be conveniently, accurately, and readily formed without complication of mechanism and loss of time for needed adjustments. So, too, in view of the slight range of movement of the recording-stylus and to enable its registrations to be accurately determined it is necessary that the longitudinal lines shall be comparatively fine as well as perfectly distinct, the necessary fineness of the lines and their accurate placing with respect to one another not being possible with the ordinary ruling-pens as constructed and in the manner they are adjustably supported.

The present improvements provide a novel form of apparatus including in addition to the line-forming devices means for printing the ribbon and for consecutively numbering the same to represent successive days for any given period.

A detailed description of the invention will now be given, reference being had to the accompanying drawings, in which—

Figure 1 is a side elevation with some parts in section of an apparatus embodying the invention. Fig. 2 is a plan view thereof. Fig. 3 is a portion of the record ribbon or strip in its complete condition ready for use. Fig. 4 is a transverse vertical section on the line 4 of Fig. 1. Fig. 5 is an enlarged detail section of the numbering-wheel and the means for moving it longitudinally along its supporting-shaft and transversely across the machine. Fig. 6 is a detailed plan view of a portion of the apparatus, showing particularly the longitudinal-line-producing devices, a portion of the record ribbon or strip being also shown and other parts being omitted. Fig. 7 is a longitudinal section of the same on line 7 of Fig. 6. Fig. 8 is a sectional detail of a portion of one of the grooved wheels supporting the threads for producing the longitudinal lines on the record-ribbon.

The apparatus consists of a suitable baseplate A, supported, say, from the ground by pedestals A' and having vertical side frames $A^2$, which provide bearings for the longitudinal-line-producing devices B, the marking or printing device C, and the consecutive-numbering device D.

The ribbon or paper strip e to be marked or otherwise prepared is carried in the form of a roll E in bearings provided by a bracket a, vertically adjustable on one of the pedestals A' by means of a set-screw a' or otherwise. The free end of the ribbon e is carried upward and thence through a guide or guide-trough b and under and over a number of straightening-rods c, therein insuring the ribbon being carried onward perfectly true and free from wrinkles or creases. From the trough the ribbon passes over a leading-roll d, thence under a flanged roll f toward the printing and consecutive-numbering devices. The roll f forms the impression device of the longitudinal-lines producing or ruling device B, which in addition thereto and coacting therewith has a plurality of endless parallel threads 2 of the proper fineness and corresponding in number to the longitudinal lines to be produced in the ribbon and adapted by contact with the ribbon to impart their impression thereto. These endless threads (see Figs. 6 and 7) are carried by a pair of finely-grooved rolls 3, mounted a distance apart with the threads taking into the grooves to be accurately positioned and guided in their continuous movement against the surface of the moving ribbon. A portion of the grooved surface of these rolls is shown in Fig. 8. The impression and ribbon-guiding roll $f$ is located about midway between the rolls 3 and depresses the active portion of the endless marking-threads 2, so that they will bear against the ribbon on the roll $f$ with sufficient pressure to impart their impression thereto. Ink or other impression-producing substance may be applied to the threads by causing them to pass through and in contact with an ink-pad $4^a$, arranged in the path of the return portion of the threads and just in advance of one of the rolls 3.

In order to adjust the position of the endless marking-threads 2 within the narrow limits not possible in some cases by simply shifting the threads laterally in the grooves of the rolls 3, there is provided a number of guide-pins 1, adapted to holes in a transverse support 4, supported directly beneath the threads and just in advance of the impression-roll $f$, so that the pins may be changed from hole to hole to bear any one or more of the desired threads to one side or the other of their natural position.

The proper position of the threads with respect to one another suited to the particular gage with which the record-ribbon is to be used should be determined in each case by some pattern known to be suited to that gage, such pattern consisting, for instance, of a short piece of the record-ribbon itself. In the present instance there is provided a pattern holder or support 5, preferably one located each side of the impression-roll $f$, adapted to contain the pattern which will immediately underlie the threads and thus serve as a form or guide by which the marking-threads may be accurately located to produce a duplication of the desired record-ribbon.

The longitudinally-ruled ribbon $e$ passes from the impression-roll $f$ over a lead-roll 10, over another like roll 11 to the printing device C, passing under and partially around its impression-cylinder 12, and thence between said cylinder and the printing or marking cylinder 13 to have impressed thereon the lower divisions and the short transverse lines indicating said divisions, as seen in Fig. 3. The cylinders 12 and 13 are mounted in suitable bearings in the side frames $A^2$ one over the other, the printing or form-carrying cylinder 13 being inked in any suitable manner, as by an inking-roll 14, receiving ink from a roll 15, which in turn has ink deposited thereon from one of a pair of rolls 16 17. The several rolls may be adjustably mounted to obtain even distribution of the ink and proper inking of the form. Thus the inking-roll 14 is carried at the end of a pair of adjustably-mounted arms 18, and the ink-roll 15 is carried by arms 19, adjustably carried by arms 18. The ink-roll 16 is carried at the end of vibrating arms 20, pivoted to the side frames and moved against the tension of a spring 22 by a cam 21, secured to the shaft of the cylinder 12, so that said roll 16 shall be moved intermittently to and from contact with the roll 15. The other roll 17 is carried by arms 23, adjustably connected to the vibrating arms 20, so as to move therewith.

No ink-fountain is shown, as such is well known and may or may not be used. When not used, a supply of ink may from time to time be applied to either one of the rolls 17 16 by a hand-operated ink-roll 24, shown supported for convenient reach on the brackets $a$ of the ribbon-web roll E.

The cylinder 13 will carry the proper form provided by any desired kind of impression-producing surface—as, for instance, an electrotype or rubber type secured to its surface in any well-known manner.

The longitudinally ruled and printed ribbon $e$ passes from the printing device C over a leading-roll 25 to the consecutive-numbering device D, represented by a number-carrying cylinder or wheel 26 and a platen 27, by which the ribbon is impressed at intervals with numbers $g$, representing consecutive days of any given period—say, for instance, a year of three hundred and sixty-five days.

The number-carrying cylinder or wheel 26 has its numerals extending in this instance from "1" to "365" in consecutive order, arranged on the circumference thereof in a continuous spiral, the cylinder having a corresponding spiral groove 6, located between the lines of numerals, with which coacts a pair of flanges of an idler 28, rotating in fixed bearings formed on a bracket 51, adjustably secured to the side frames, (see Fig. 5,) so that the cylinder 26 is progressively moved laterally as it is rotated. This numeral cylinder is mounted loosely on a cross-shaft 29, supported in bearings extending from the side frames, (see Fig. 4,) and is rotated step by step by power applied to said shaft. For this purpose and yet to permit a uniform and absolutely steady lateral movement of the cylinder from one side to the other of its bearings the shaft 29 carries rigid therewith a U-shaped arm 30, a member of which extends parallel with the shaft between flanged guide-rolls 31, carried by the central web of the cylinder. The cylinder is thus free to move laterally both on the shaft and the U-shaped arm, and yet is so connected to the shaft by means of said arms as that it is positively rotated therewith. A second U-shaped arm 30 and rolls 31 may be provided, if desired, as shown by dotted lines, Fig. 1.

The step-by-step rotation of the number-carrying cylinder 26 is had by means of a ratchet-wheel 32, fast to the end of the shaft 29, with which engages at diametrically opposite points two palls 33, carried by independently-vibrated arms 34 from any moving part of the machine, as by means of a pair of eccentrics 35 on the shaft of the cylinder 12, one for each pawl-arm, and connected with said arms by means of eccentric-straps and connecting-rods 36, as seen in Fig. 2. One pawl serves to prevent backward rotation of the cylinder D when the other is rotating it forwardly.

The impression of the numerals of the cylinder 26 on the record-ribbon e is had by the timely impulse or movement of the coacting platen 27. This platen 27 is of hammer form carried at one end of a vertically-vibrating lever 37, pivoted between its ends to one of the side frames and held in its idle position or with its platen away from cylinder 26 by means of a spring 37', engaging the under side of said lever at that side of its pivot opposite to the platen 27.

The impression impulse of the platen 27 is given by a retractile spring 38, which is connected at its upper end to that end of lever 37 opposite the platen and at its lower end secured to the frame, the lever 37 being operated against the action of the spring 38 and then released by a suitable trip mechanism. This trip mechanism consists in the present instance of a suitably-shaped cam 39, fast on the shaft of the printing-cylinder 13, which cam acts to depress the fore end of a vertically-vibrating lever 40, which is connected at its opposite end by a vertical link 41 to a hook-end lever 42, pivoted to the lower end of an arm 43, rigidly secured at its upper end to the platen-carrying lever 37 between its axis and the spring 38. The hook end of lever 42 is held down upon a shouldered cam 8, fast on the shaft of leading-roll 11 by means of a spring 44, and the shoulder of this cam 8 draws the lever 42 suddenly to the left and thereby, through arm 43, rocks the platen-carrying lever 37 against the action of spring 38 to retract the platen 27. Immediately thereafter the high part of cam 39 depresses the fore end of lever 40 and raises the hooked lever 42 out of engagement with the shoulder of cam 8, whereupon the platen 27 is projected upwardly against cylinder 26 by the contraction of spring 38. The spring 37' will then restore the platen to its inactive position shown in Fig. 1, though the weight of the platen alone may serve to do this, as the spring 38 will no longer be under tension. The cam 8 retracts and the cam 39 releases the platen 27 twice at every revolution, and hence the two eccentrics 35 are employed to give a corresponding movement to the cylinder 26.

An inked impression in contradistinction to an embossed one may be had by providing an ordinary ink-ribbon 50, suitably supported and operated as in type-writers and which is led between the indicator-ribbon e and the numeral-cylinder 26. The now completed indicator-ribbon may be directed from the machine and taken care of in any suitable manner, as by leading it over a flanged feed-roller 52, where it is fed onward by an endless tape 53, passing around the feed-roll and thence under a gravitating tension-roll 54.

Suitable motion is imparted to the various parts of the mechanism by a belt 55, passing around a driving-pulley 56, mounted loosely on the shaft 57, carrying the roll 11 and platen-tripping cam 8, said pulley being connected to the shaft by a suitable clutch device 58, when the two members are moved into clutching position for the purpose. The opposite end of the shaft 57 carries a pulley 59, around which is stretched a belt 60 for driving a pulley 61, fast to the shaft of one of the marking-thread rolls 3. The shaft 57 also carries another pulley 62, adjacent the driving-pulley 56 and carrying a belt 63 for driving a pulley 64, fast to the shaft of the flanged roller 52. The printing device C is likewise rotated from said shaft 57 by a pinion 65, fast thereto and in mesh with a toothed wheel 66 of the impression-cylinder 12, which wheel in turn meshes with a similar wheel 67, fast to the printing-cylinder 13, and the latter wheel in turn meshing with a pinion 68 of the inking-roll 14 for properly rotating the latter.

It will be understood that the mechanism described is in the main illustrative of a practical embodiment of the invention, and hence modifications thereof may be made therein without necessarily departing from the scope thereof. The lines producing or ruling device is obviously applicable to other uses than ruling recording-ribbons and may be employed either alone or with devices other than those described.

What I claim is—

1. In a ruling device, the combination with the impression device, of grooved rolls at opposite sides thereof, endless parallel marking-threads spaced apart by said rolls and coacting with the impression device with their upper runs, and means for rotating one of said grooved rolls, substantially as described.

2. The combination with the impression device, of grooved rolls at opposite sides thereof, endless marking-threads passed around said rolls and coacting with the impression device with their upper runs, and a support for a pattern within the space between the two runs of the threads, substantially as described.

3. In a ruling device, the combination of an impression device for the material to be ruled, a plurality of suitably-supported parallel marking-threads coacting with the impression device, and a support for a pattern arranged adjacent the threads to act as a guide for the proper location of said threads, as described.

4. In a ruling device, the combination with the impression-roll for the material to be ruled, parallel endless marking-threads coacting at their upper ends with said impression-roll, and a pair of grooved rolls around which said threads are stretched, of an auxiliary means of adjustment for said threads, and a pattern-holder in the space between the two runs of the threads, substantially as described.

5. In a ruling device, the combination with the impression-roll for the ribbon or strip to be ruled, grooved rolls at opposite sides thereof, means for rotating one of said grooved rolls, endless parallel marking-threads spaced apart by said rolls and coacting at their upper runs with said impression-roll, of auxiliary adjusting devices for adjusting the upper runs of the threads independent of the grooved rolls, substantially as described.

6. In a ruling device, the combination of the impression-roll for the ribbon or strip to be ruled, a plurality of parallel endless marking-threads coacting with said impression-roll, a pair of grooved rolls around which said threads are stretched, a support for a pattern arranged adjacent each roll, and a plurality of removable pins for transversely adjusting the positions of the threads, as set forth.

7. The herein-described ruling mechanism, comprising the parallel grooved rolls, one of which is driven, the endless marking-threads passing around said rolls and spaced by the grooves thereof, an impression-roll journaled over the upper run of the threads, a guide and leading roll for guiding the strip to be ruled under said impression-roll, and a pattern holder or support between the two runs of the threads, substantially as described.

8. The combination with the endless traveling ruling-threads and the impression-roll over the upper runs thereof, of an inking device for the threads, an apertured plate under the upper runs of the threads at one side of the impression-roll and removable pins in said apertures for properly spacing the threads, substantially as described.

9. The herein-described ruling mechanism, comprising a suitable frame, a bracket for supporting the roll of paper to be printed, a guide-trough above the bracket and having rods for straightening the strip, a leading-roll at the forward end of the trough, an impression-roll under which the strip passes from the leading-roll, parallel grooved rolls at opposite sides of the impression-roll and the endless ruling or marking threads passed around said grooved rolls, substantially as set forth.

10. The combination with the frame, and the mechanism for ruling the strip longitudinally, of an impression-cylinder around which the strip or ribbon passes from the ruling mechanism, a printing-cylinder over the impression-cylinder and provided with devices for printing the transverse graduations at the opposite edges of the strip, a consecutive-numbering cylinder parallel with the printing-cylinder and above the line-ruling mechanism and under which the strip or ribbon passes from the printing-cylinder, a platen movable toward and from the said numbering-cylinder and mounted between the said cylinder and the ruling mechanism, and an operating mechanism for actuating the numbering-cylinder from the shaft of said impression-cylinder a single character at predetermined intervals, substantially as described.

11. The combination with the impression-cylinder and the printing-cylinder coacting therewith, of an intermittently-actuated rotary numbering-cylinder having a spirally-arranged series of consecutive numbers and having a sliding movement, a spring-projected platen for the numbering-cylinder, mechanism for retracting the platen at regular intervals, mechanism actuated from the axis of the printing-cylinder to release the platen, and mechanism actuated from the shaft of the impression-cylinder for operating the numbering-cylinder, the space of a single number for every time its platen is released, substantially as described.

12. The combination with the printing-cylinder having a cam on its axis, and an impression-cylinder provided with an eccentric, of a rotary numbering-cylinder having a rotary shaft on which it slides and with which it turns, said cylinder having a spirally-arranged series of consecutive numbers, and an external spiral groove, a flange entering said groove, a ratchet-wheel on the shaft of the numbering-wheel, a lever having a pawl engaging said ratchet-wheel, and a rod connected at one end to the eccentric and at its opposite end engaging said pawl-lever, a lever pivoted below the printing-cylinder, and provided at one end with a platen to coöperate with the numbering-cylinder, a spring for projecting the platen toward said cylinder, a hooked lever for rocking the platen-lever against the action of its spring, a cam having a shoulder to engage and operate said hooked lever, and a trip-lever connected with the hooked lever and actuated from the cam on the axis of the printing-cylinder, substantially as described.

13. The combination with the rotary non-slidable shaft and means for rotating it intermittently, of a cylinder sliding on and turning with said shaft, and having a series of numbers arranged spirally around its exterior, a spiral groove being formed between the lines of numerals, and an idler rotating in fixed bearings and provided with flanges engaging the groove at opposite sides of the line of numerals, substantially as described.

14. The combination with the numeral-carrying cylinder having an external spiral groove, and a flanged idler engaging the groove to cause the cylinder to move endwise when rotated, of a rotary non-sliding shaft extending through the cylinder and provided with a parallel arm also passing freely through the cylinder, the said cylinder having antifriction-wheels between which said arm passes, substantially as described.

In witness whereof I have set my hand in the presence of two witnesses.

JARVIS B. EDSON.

Witnesses:
 GEO. H. GRAHAM,
 CHAS. W. FORBES.